(12) United States Patent
Nishimura et al.

(10) Patent No.: US 7,218,736 B1
(45) Date of Patent: May 15, 2007

(54) DATA TRANSFER METHOD

(75) Inventors: Takuya Nishimura, Osaka (JP); Hiroyuki Iitsuka, Osaka (JP); Masazumi Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/403,560

(22) PCT Filed: Apr. 22, 1998

(86) PCT No.: PCT/JP98/01837

§ 371 (c)(1),
(2), (4) Date: Jan. 12, 2000

(87) PCT Pub. No.: WO98/48543

PCT Pub. Date: Oct. 29, 1998

(30) Foreign Application Priority Data

Apr. 24, 1997 (JP) .................................. 9-106995

(51) Int. Cl.
*H04L 9/00* (2006.01)
(52) U.S. Cl. ...................................... 380/201; 713/160
(58) Field of Classification Search ................ 380/203, 380/201; 705/57, 51; 713/160, 169
See application file for complete search history.

(56) References Cited

U.S. PATENT DOCUMENTS

| | | | | |
|---|---|---|---|---|
| 5,208,807 A | * | 5/1993 | Gass et al. ................... 370/458 |
| 5,706,348 A | * | 1/1998 | Gray et al. .................. 713/160 |
| 5,948,136 A | * | 9/1999 | Smyers ....................... 710/107 |
| 6,028,933 A | * | 2/2000 | Heer et al. ................... 713/169 |
| 6,041,051 A | * | 3/2000 | Doshi et al. ................. 370/352 |
| 6,157,972 A | * | 12/2000 | Newman et al. ............ 710/100 |
| 6,349,138 B1 | * | 2/2002 | Doshi et al. ................. 380/200 |
| 6,438,693 B1 | * | 8/2002 | Nakano ........................ 713/189 |
| 6,539,094 B1 | * | 3/2003 | Osakabe et al. ............ 380/283 |

FOREIGN PATENT DOCUMENTS

| | | |
|---|---|---|
| EP | 0 684 721 | 11/1995 |
| EP | 0 756 276 | 1/1997 |
| JP | 61-81043 | 4/1986 |
| JP | 61-260735 | 11/1986 |

(Continued)

OTHER PUBLICATIONS

Japanese language search report for Int'l Appln No. PCT/JP98/01837 dated Jul. 28, 1998.

(Continued)

*Primary Examiner*—Matthew Smithers
(74) *Attorney, Agent, or Firm*—RatnerPrestia

(57) ABSTRACT

A data transfer method which eliminates erroneous operation of conventional devices not supporting encryption when copy-protected AV information is encrypted and sent on an IEEE 1394 bus. Synchronous data transferred through isochronous communication contains i) encryption identification information for indicating encryption of actual data and ii) actual data. Only the actual data is encrypted. Encryption identification information indicating encryption of actual data in synchronous data is sent together with actual data from the sending device. A receiving device detecting encryption of actual data from this encryption identification information requests decrypting information from the sending device. The receiving device decrypts the actual data using decrypting information received from the sending device according to this request.

20 Claims, 5 Drawing Sheets

FOREIGN PATENT DOCUMENTS

| | | |
|---|---|---|
| JP | 1/181349 | 7/1989 |
| JP | 1-307341 | 12/1989 |
| JP | 9-205421 | 8/1997 |

OTHER PUBLICATIONS

English translation of Japanese language search report.

European Search Report corresponding to application No. EP 98-91-7616 dated Feb. 8, 2005.

Bloks R.H.J.: "The IEEE-1394 High Speed Serial Bus," Philips Journal of Research, Elsevier, Amsterdam, NL, vol. 50, No. 1, 1996, pp. 209-216.

* cited by examiner

FIG. 3A

| | msb | | | | | | | lsb | |
|---|---|---|---|---|---|---|---|---|---|
| opcode | \multicolumn{8}{c|}{Authentication and Key exchange} | |
| operand[0] | \multicolumn{4}{c|}{$F_{15}$} | \multicolumn{4}{c|}{algorithm ID} | ⟵ 200 |
| operand[1] | \multicolumn{8}{c|}{$FF_{16}$} | |
| operand[2] | \multicolumn{8}{c|}{$FF_{16}$} | |
| operand[3] | \multicolumn{8}{c|}{$FF_{16}$} | |
| operand[4] | \multicolumn{8}{c|}{$FF_{16}$} | |
| operand[5] | \multicolumn{8}{c|}{$FF_{16}$} | |
| operand[6] | \multicolumn{8}{c|}{$FF_{16}$} | |
| operand[7] | \multicolumn{8}{c|}{$FF_{16}$} | |
| operand[8] | \multicolumn{8}{c|}{$FF_{16}$} | |

208 operation code

FIG. 3B

| | msb | | | | | | | lsb | |
|---|---|---|---|---|---|---|---|---|---|
| opcode | \multicolumn{8}{c|}{Authentication and Key exchange} | |
| operand[0] | \multicolumn{4}{c|}{0} | \multicolumn{4}{c|}{algorithm ID} | ⟵ 200 |
| operand[1] | (msb) | | | | | | | | ⟵ 201 |
| operand[2] | | | | algorithm field | | | | (lsb) | |
| operand[3] | \multicolumn{8}{c|}{$FF_{16}$} | |
| operand[4] | \multicolumn{8}{c|}{$FF_{16}$} | |
| operand[5] | \multicolumn{8}{c|}{$FF_{16}$} | |
| operand[6] | \multicolumn{8}{c|}{$FF_{16}$} | |
| operand[7] | (msb) | | | | | | | | ⟵ 212 |
| operand[8] | | | | maximum data length | | | | (lsb) | |

208 operation code

FIG. 3C

| | msb | | | | | | | lsb | |
|---|---|---|---|---|---|---|---|---|---|
| opcode | \multicolumn{8}{c|}{Authentication and Key exchange} | |
| operand[0] | \multicolumn{4}{c|}{reserved} | \multicolumn{4}{c|}{algorithm ID} | ⟵ 200 |
| operand[1] | (msb) | | | | | | | | ⟵ 201 |
| operand[2] | | | | algorithm field | | | | (lsb) | |
| operand[3] | \multicolumn{4}{c|}{label 202} | \multicolumn{4}{c|}{step No.} | ⟵ 203 / 299 |
| operand[4] | \multicolumn{8}{c|}{subfunction} | ⟵ 204 |
| operand[5] | \multicolumn{8}{c|}{channel No.} | ⟵ 206 |
| operand[6] | \multicolumn{4}{c|}{block No. 205} | \multicolumn{4}{c|}{total block No.} | |
| operand[7] | (msb) | | | | | | | | ⟵ 209 |
| operand[8] | | | | data_length | | | | (lsb) | |
| operand[9] | | | | | | | | | ⟵ 207 |
| ⋮ | | | | data | | | | | |
| operand[8+ data_length] | | | | | | | | | |

208 Operation code

DATA TRANSFER METHOD

This application is a U.S. National Phase Application of PCT International Application PCT/JP98/01837

FIELD OF THE INVENTION

The present invention relates to the field of digital data transfer methods, more particularly to the transfer of data in which normal digital data and encrypted digital data co-exist in the same data.

BACKGROUND OF THE INVENTION

One conventional data transfer method adopts the IEEE1394 standard (IEEE: The Institute of Electrical and Electronics Engineers, Inc.). (Reference: IEEE Std 1394: 1995, High Performance Serial Bus.) In data transfer specified by the IEEE 1394 standard, there are two methods of communication. One is isochronous communication, which is suitable for transferring synchronous data such as digital video signals and digital audio signals. The other is asynchronous communication, which is suitable for transferring asynchronous data such as control signals. Both methods of communication are applicable on the IEEE 1394 bus network. Isochronous communication is what is called "Broadcast communication, and an isochronous packet output from one device coupled to the IEEE 1394 bus is receivable by all the other devices coupled to the same bus. On the other hand, asynchronous communication is applicable to both one-to-one communication and one-to-N broadcast communication. Each asynchronous packet output from one device coupled to the bus contains an identifier specifying the device(s) to which that packet is addressed. If this identifier specifies a particular device, only the device specified by the identifier receives the asynchronous packet. If the identifier specifies broadcast, all the devices coupled to the same bus receive the asynchronous packet.

At present, the IEC (International Electrotechnical Commission) is preparing to stipulate the IEC1883 standard (hereafter referred to as AV protocol) for transferring digital audio signals and digital video signals or transmitting data between devices coupled to an IEEE 1394 bus, employing the data transfer method conforming to the IEEE 1394 standard. In the AV protocol, video and audio data is located in the isochronous packet as shown in FIG. 5 and transferred. The isochronous packet includes a CIP (Common Isochronous Packet) header. The CIP header carries information that includes the type of AV data, the identification number of the device which is sending the isochronous packet, and the like.

FIG. 5 shows the format of the isochronous packet used in the AV protocol. The isochronous packet comprises an isochronous packet header 900, header CRC 901, isochronous payload 902, and data CRC 903. The isochronous packet header 900 contains a tag 907. The tag 907 shows that the isochronous packet conforms to the AV protocol when its value is 1. When the value of the tag 907 is 1, which means that the isochronous packet conforms to the AV protocol, the isochronous payload 902 has a CIP header 904 at its beginning. The CIP header 904 comprises a source ID 906 which identifies the device transmitting the isochronous packet. The CIP header 904 also comprises FMT 908 and FDF 909 which specify the type of actual data 905 in the isochronous payload 902. Digital AV data is contained in the actual data 905, but the actual data 905 is not always contained in the isochronous payload 902. Some packets may have an isochronous payload 902 which contains only the CIP header 904 without the actual data 905.

There is a group of commands called the AV/C Command Set for controlling devices in accordance with the AV protocol (Reference: 1394 TRADE ASSOCIATION Specification for AV/C Digital Interface Command Set Version 1.0, Sep. 13, 1996). These commands and their responses are transferred by means of asynchronous communication.

In the conventional data transfer method as described above, compatibility with conventional devices which are not designed for transferring an encrypted isochronous payload 902 cannot be secured when an encrypted isochronous packet, which contains the isochronous payload 902 which has been encrypted for copy protection, is sent. More specifically, conventional devices are designed with the precondition that the CIP header 904 is normally positioned at the beginning of the isochronous payload 902. Accordingly, if the isochronous payload 902 is encrypted, conventional devices cannot correctly read out the encrypted CIP header 904, and decide that the isochronous packet does not conform to the AV protocol. A device receiving encrypted isochronous packets thus may not operate properly. In other words, such receiving devices cannot determine the type of data contained in the actual data 905, resulting in an inability to identify the device transmitting the isochronous packet. In addition, asynchronous communication such as queries to the sending device are disabled. Accordingly, normal receiving operations cannot be carried out.

Furthermore, if the isochronous packet output from the sending device is encrypted while the receiving device is receiving the data, some conventional devices may not be able to correctly read out the CIP header 904 as soon as encryption starts, resulting in inability to receive data properly.

In order to send AV information encrypted for copy protection from the sending device and decrypt the encrypted AV data by the authorized receiving device, the sending device needs to give decrypting information to the authorized receiving device. In the conventional data transfer method, however, the sending device may be required to execute extremely complicated procedures in order to specify the receiving device. More specifically, each isochronous packet contains the source ID 906 which is the identifier of the sending device, but these packets do not contain information that identifies which device is authorized to receive these packets. The sending device thus cannot check which device is receiving the isochronous packets during transmission of the isochronous packets. In order to find which of the devices coupled to the IEEE 1394 bus is receiving the data, the sending device may require to query the data receiving status of every device coupled to the same bus. This makes the procedures for giving key information for decryption extremely complicated.

SUMMARY OF THE INVENTION

A data transfer method of the present invention satisfies the conventional communication standard even in the case of sending encrypted video and audio information via isochronous communication. In addition, the present invention offers a data transfer method which prevents erroneous operation even if conventional receiving devices receive isochronous packets containing encrypted video and audio data.

The present invention still further offers a data transfer method which significantly simplifies procedures for giving key information for decryption from a sending device to an authorized receiving device.

In a data transfer method of the present invention, synchronous data transferred via isochronous communication contains i) encryption identification information which indicates encryption status of actual data and ii) actual data, and only the actual data is encrypted.

To solve another problem in the conventional data transfer method, the encryption identification information which indicates encryption status of the actual data in the synchronous data is sent together with the actual data from the sending device so that receiving device can detect that the actual data is encrypted based on this encryption identification information and request decrypting information to the sending device in the data transfer method of the present invention. Then, the receiving device receiving the decrypting information sent from the sending device upon request decrypts the actual data using this decrypting information to complete data transfer.

Also in the data transfer method of the present invention, the receiving device receiving synchronous data checks for the encryption identification information contained in the synchronous data. If the receiving device detects that the actual data is encrypted, the receiving device requests for decrypting information for decrypting the actual data to the sending device. This request is made using a command in the AV/C set via asynchronous communication. At receiving this request, the sending device checks the packet header of received command to identify the device making the request, i.e., the receiving device. The sending device then gives decrypting information to the identified receiving device using a command via asynchronous communication, enabling to realize the data transfer method with extremely simple procedures for giving decrypting information from the sending device to receiving device.

Moreover, in the data transfer method of the present invention, only the actual data in the synchronous data is encrypted, and the encryption identification information indicating the encryption status of the actual data is included in the synchronous data. This enables to transfer the CIP header without being encrypted, preventing erroneous operation when the conventional device receives such encrypted synchronous data. In other words, the present invention realizes a data transfer method which assures compatibility with the conventional data transfer method and eliminates the possibility of erroneous operation when the conventional receiving device receives encrypted synchronous data.

Furthermore, the data transfer method of the present invention eliminates the possibility of erroneous operation of the receiving device receiving data when encryption of synchronous data starts while continuously receiving synchronous data from the sending device because the CIP header is not encrypted and transferred as it is.

BRIEF DESCRIPTION OF THE DRAWING

FIG. 3A is a format of AKE status command in accordance with the preferred embodiment of the present invention.

FIG. 3B is a format of AKE response to the AKE status command in accordance with the preferred embodiment of the present invention.

FIG. 3C is a format of AKE control command in accordance with the preferred embodiment of the present invention.

DESCRIPTION OF THE PREFERRED EMBODIMENT

A preferred embodiment of the present invention is described next with reference to drawings.

Figure 1:
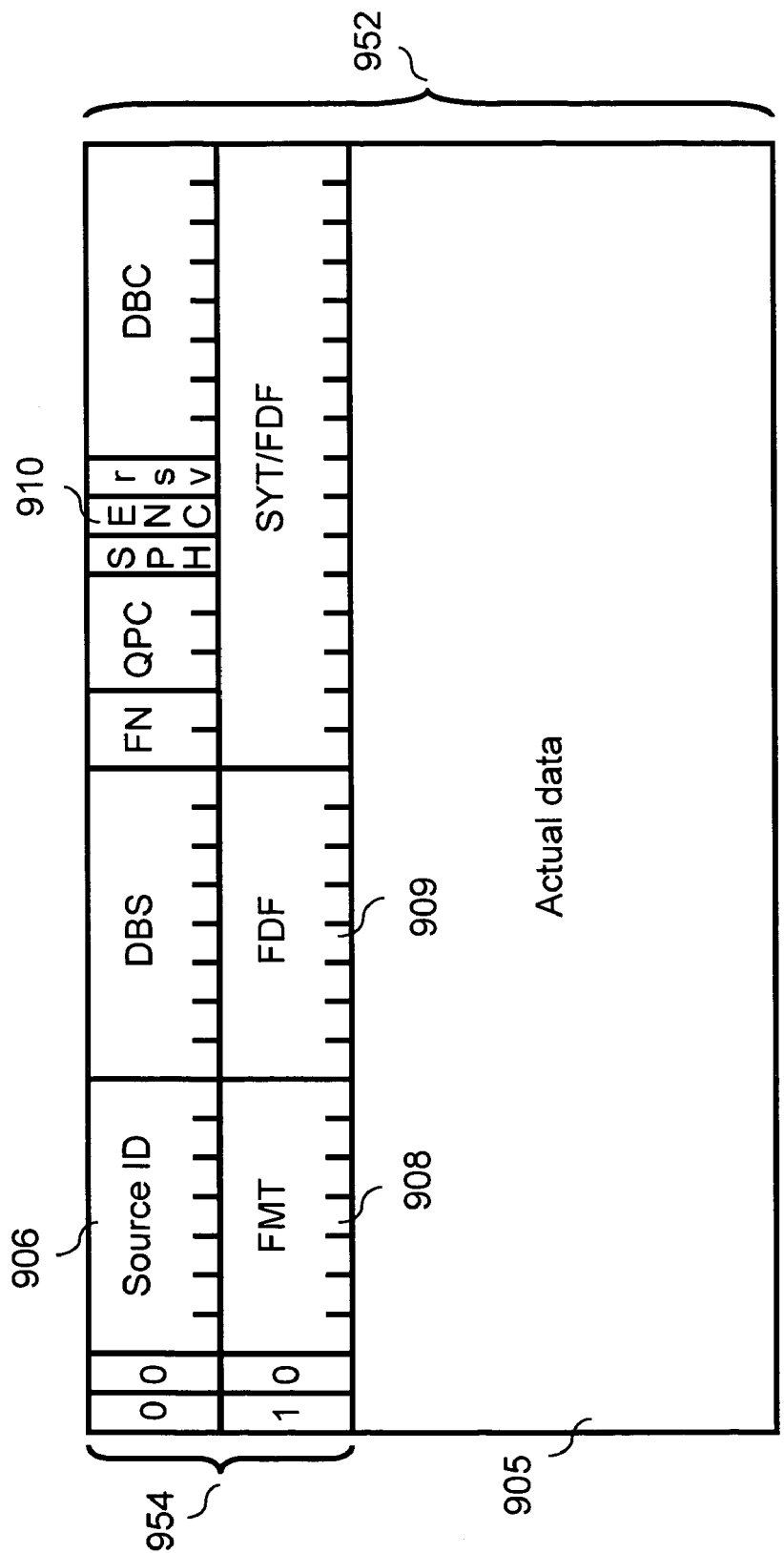
FIG. 1 is a schematic view of a format of a CIP header in accordance with a preferred embodiment of the present invention.

FIG. 1 shows a format of the payload of an isochronous packet to be transferred in the preferred embodiment of the present invention. The preferred embodiment is one example of the transfer of a TSP (Transport Packet) in accordance with MPEG (the Moving Picture Expert Group) specifications. The ENC (hereafter referred to as encryption status) 910 indicates whether the actual data 905 is encrypted or not.

Figure 2:
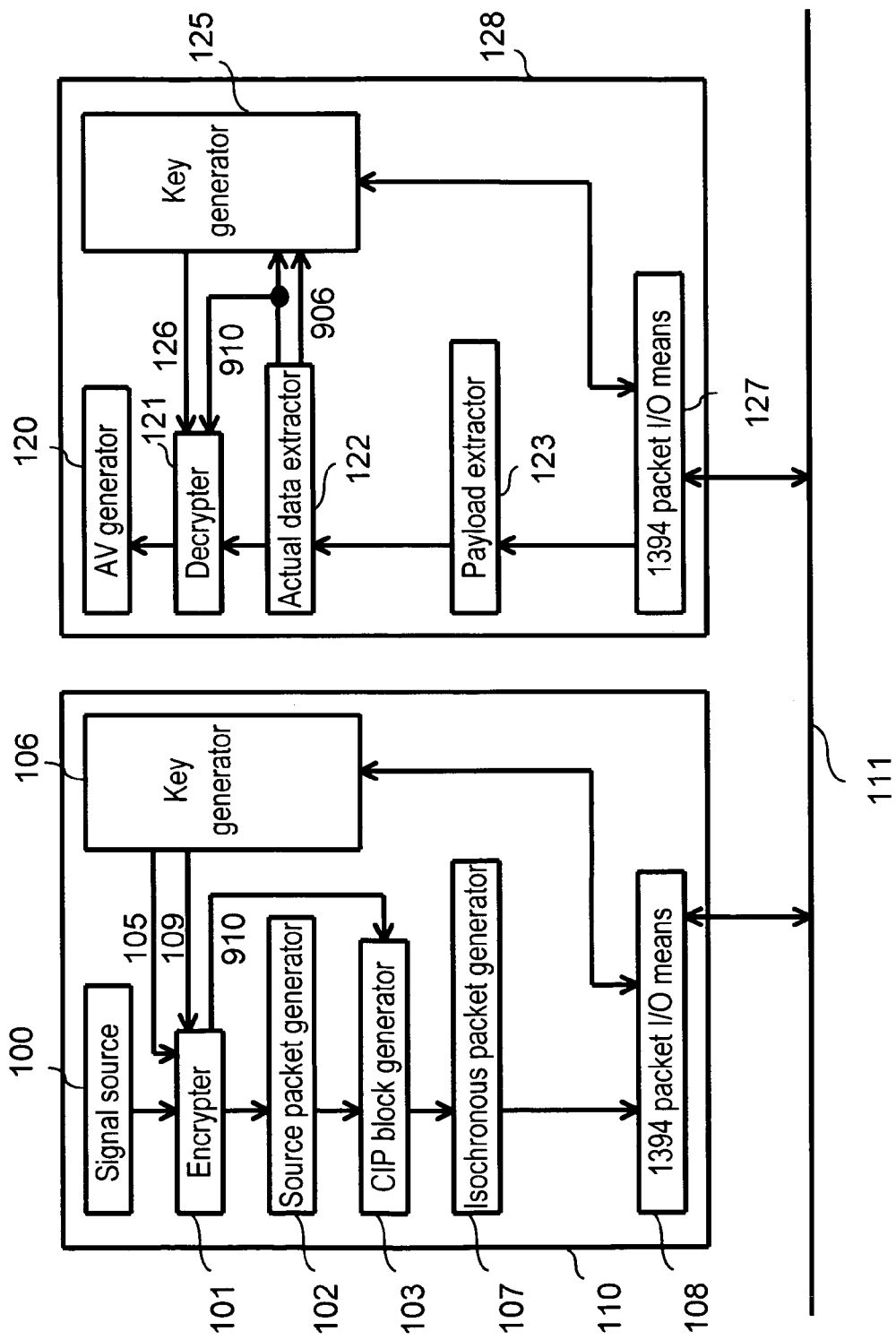
FIG. 2 is a block diagram illustrating functions of sending and receiving devices in accordance with the preferred embodiment of the present invention.

FIG. 2 shows the relation between sending and receiving devices in the preferred embodiment of the present invention. A sending device 110 and receiving device 128 are coupled via an IEEE 1394 bus (hereafter referred to as a 1394 bus) 111.

First, the functions of each block in the sending device 110 are described.

A signal source 100 outputs an MPEG transport packet TSP (not illustrated) in an 188 byte unit, which will be sent via the 1394 bus 111, to an encrypter 101. In other words, in the preferred embodiment, the signal source 100 outputs data with a fixed length of 188 bytes. The encrypter 101 encrypts and outputs the TSP received from the signal source 100 using an encryption key 109 provided by a key generator 106. In the preferred embodiment, the encryption key is equivalent to the decrypting information. An output command 105 is a command from the key generator 106 to the encrypter 101. There are three types of commands: normal output, encrypted output, and empty output. If the encrypter 101 receives the output command 105 for normal output, the TSP received from the signal source 100 is output without modification, and registers the value 0 as the encrypting information 910. If the output command 105 is for encrypted output, the encrypter 101 encrypts the TSP with the encryption key 109 received from the key generator 106, and registers the value 1 as the encrypting information 910. If the output command 105 is for empty output, the encrypter 101 outputs an empty signal (not illustrated) every time it receives a TSP from the signal source 100, and registers the value 1 as the encrypting information 910. A source packet generator 102 adds a 4-byte source packet header to the 188-byte TSP received from the encrypter 101, and outputs a 192-byte source packet (actual data 905). A CIP block generator 103 adds a CIP header 954 to the source packet received from the source packet generator 102, and outputs an isochronous payload 952. Here, the CIP block generator 103 places the encrypting information 910 received from the encrypter 101 in the CIP header 954. An isochronous packet generator 107 adds an isochronous packet header 900, header CRC 901, and data CRC 903 to the isochronous payload 952 received from the CIP block generator 103, and outputs an isochronous packet. Since the content of the isochronous payload 952 is data that conforms to the AV protocol, the value of the tag 907 is set to 1. The key generator 106 sends the encryption key 109 to the receiving device 128 by communicating the asynchronous packet with the receiving device 128, as shown in FIG. 3, which is described later. The key generator 106 also outputs the encryption key 109 to the encrypter 101 as described above.

A 1394 packet I/O means 108 inputs and outputs isochronous and asynchronous packets between the 1394 bus 111 and sending device 110. More specifically, the 1394 packet I/O means 108 outputs the isochronous packet received from the isochronous packet generator 107 and asynchronous packet received from the key generator 106 to the 1394 bus 111, and also outputs asynchronous packet received from the 1394 bus 111 to the key generator 106.

Next, functions of each block of the receiving device 128 are described.

A 1394 packet I/O means 127 inputs and outputs isochronous and asynchronous packets between the 1394 bus 111 and receiving device 128. More specifically, the 1394 packet I/O means 127 outputs the isochronous packet received from the 1394 bus 111 to a payload extractor 123, and outputs asynchronous packet received from the 1394 bus 111 to a key generator 125. The 1394 packet I/O means 127 also outputs asynchronous packet received from the key generator 125 to the 1394 bus 111.

The payload extractor 123 receives the isochronous packet, transmitted from the 1394 bus 111, from the 1394 packet I/O means 127. When the value of the isochronous packet tag 907 is 1, the payload extractor 123 determines that an isochronous payload 952 contains data conforming to the AV protocol, and outputs the isochronous payload 952 to an actual data extractor 122. When received isochronous payload 952 contains the actual data 905, the actual data extractor 122 outputs the actual data 905 to a decrypter 121, after removing the CIP header 954 placed at the beginning of the isochronous payload 952. The actual data extractor 122 also outputs the source ID 906 and encrypting information 910 extracted from the CIP header 954 to the key generator 125. The encrypting information 910 is also output to the decrypter 121. The key generator 125 receives an encryption key 126 as a result of exchanging asynchronous packet with the sending device 110 via asynchronous communication, which is described later, and outputs the encryption key 126 to the decrypter 121. When the value of the encrypting information 910 received from the actual data extractor 122 is 0, the decrypter 121 outputs the actual data 905 received from the actual data extractor 122 to an AV generator 120 as it is. When the value of the encrypting information 910 is 1, the decrypter 121 decrypts the actual data 905 using the encryption key 126 received from the key generator 125, and outputs decrypted actual data 905 to the AV generator 120.

Next, the transmission of an asynchronous packet via the aforementioned asynchronous communication setup is described.

FIGS. 3A to 3C illustrate how the format of the asynchronous packet is transmitted by asynchronous communication. More specifically, FIGS. 3A and 3C show the command formats of the AKE commands (AKE: Authentication and Key Exchange) communicated between the key generators 106 and 125. FIG. 3B shows the response format. These commands and responses belong to the AV/C Command Set, and are communicated between the sending device 110 and receiving device 128 using the asynchronous communication. By communicating these commands and responses, the sending device 110 and receiving device 128 exchange information required for the authentication of each other and encryption keys 109 and 126. The AKE commands comprise AKE control commands for requesting a target device to carry out a specific operation, and an AKE status commands for querying the status and capabilities of the target device.

FIG. 3A shows the format of the AKE status command. In the AKE status command, an operation code 208 indicates that this command is an AKE command. The value of the algorithm ID 200 is set at 0, with other values reserved for future extension.

FIG. 3B shows the format of responses to the AKE status commands. This is a response sent back from the device receiving the AKE status command to the device issuing the AKE status command. There are multiple procedures for exchanging information for mutual authentication and transmission of encryption keys 109 and 126 between the sending device 110 and receiving device 128. In an algorithm field 201, the identifier for an information exchange procedure which the device returning an applicable response can execute is assigned in bits. In other words, the receiving device 128 exchanges several commands and responses with the sending device 110 after an encrypted TSP is detected in line with the aforementioned procedures and before receiving the encryption keys 109 and 126. There is more than one procedure for communicating these commands and responses. The device sending back the response designates the executable information exchange procedure by setting 1 to an applicable bit in the algorithm field 201. Since the size of the algorithm field 201 is 16 bits, a maximum of 16 types of information exchange procedures can be indicated. The maximum data length 212 indicates the longest receivable data length in the form of bytes for exchanging AKE commands and responses.

FIG. 3C shows the format of the AKE control commands. The algorithm field 201 in the AKE control commands set informs of an executed information exchange procedure when the value of the algorithm ID 200 is 0. Only one bit in the algorithm field 201 of the AKE control command and the response to AKE control commands is set at 1, and the other bits are 0. A bit having the value 1 indicates the information exchange procedure being used. A label 202 is used for identifying correspondence between AKE control commands. For example, let's say a certain information exchange procedure specifies that the device receiving an AKE control command needs to return a different AKE control command corresponding to the AKE control command received when the AKE control command is sent from one device to another. In this case, the label 202 inserted in the returned AKE control command will have the same value as the label 202 inserted in the first AKE control command received, in order to clarify the correlation between both AKE control commands. In step No. 203, a serial number from 1 is given to each AKE control command in the sequence of communication in the information exchange procedure.

A subfunction 299 takes the values shown in Table 1, and the meaning of each AKE command is determined by these values.

TABLE 1

| Subfunction | Value |
| --- | --- |
| Make-response | 0016 |
| Verify-me | 0116 |
| Create-key-information | 1016 |
| Reconstruct-key | 1116 |
| Exchange | 2016 |

If the subfunction 299 is the make-response, this AKE control command challenges the authentication of the device receiving this command. Here, the data 207 contains authentication challenge data expressed as random numbers to authenticate the receiving device. The device receiving this command returns an AKE control command whose subfunction 299 is set to verify-me.

When returning the AKE control command, the data stored in the data 207 is the authentication response data which is a result of a predetermined operation with respect to the authentication challenge data in the received data 207. The key information used for this operation is a key given only to an authorized device in advance. Whether the device executing the operation is an authorized device or not can be determined by checking the returned authentication response data.

If the subfunction 299 is the create-key-information, this AKE control command requests the encryption key 109 to the device receiving this command. The device receiving this AKE control command returns the AKE control command whose subfunction 299 is set to reconstruct-key. At this point, the encrypted encryption key 109 is stored in the data 207 and returned.

If the subfunction 299 is the exchange, this AKE control command requests the exchange of key information between devices sending and receiving the command. This key information is stored in the data 207 and transferred for indirect authentication between devices or the creation of a common key.

Values other than those specified in Table 1 are reserved for future extension. The channel No. 204 indicates the channel number for isochronous communication between the sending device 110 and receiving device 128. This channel No. 204 is valid only when the subfunction 299 is set to the create-key-information or reconstruct-key. In other cases, this value will be set to FF in hexadecimal format. Block No. 205 and total block No. 206 are used when data which should be handled by the AKE control command cannot be sent by one AKE command. In this case, applicable data is divided into blocks, and transferred in several transmissions. The total block No. 206 indicates the number of divided blocks in applicable data. The block No. 205 indicates the number of each block in the data 207. The data length 209 indicates the valid data length, as bytes, in the data 207. The data 207 is data exchanged by the AKE control command. The device receiving the AKE control command returns a response to that specific AKE control command. The format and value of the response are the same as those of the received AKE control command. The only detail which differs is that the response does not contain the data 207.

Figure 4:
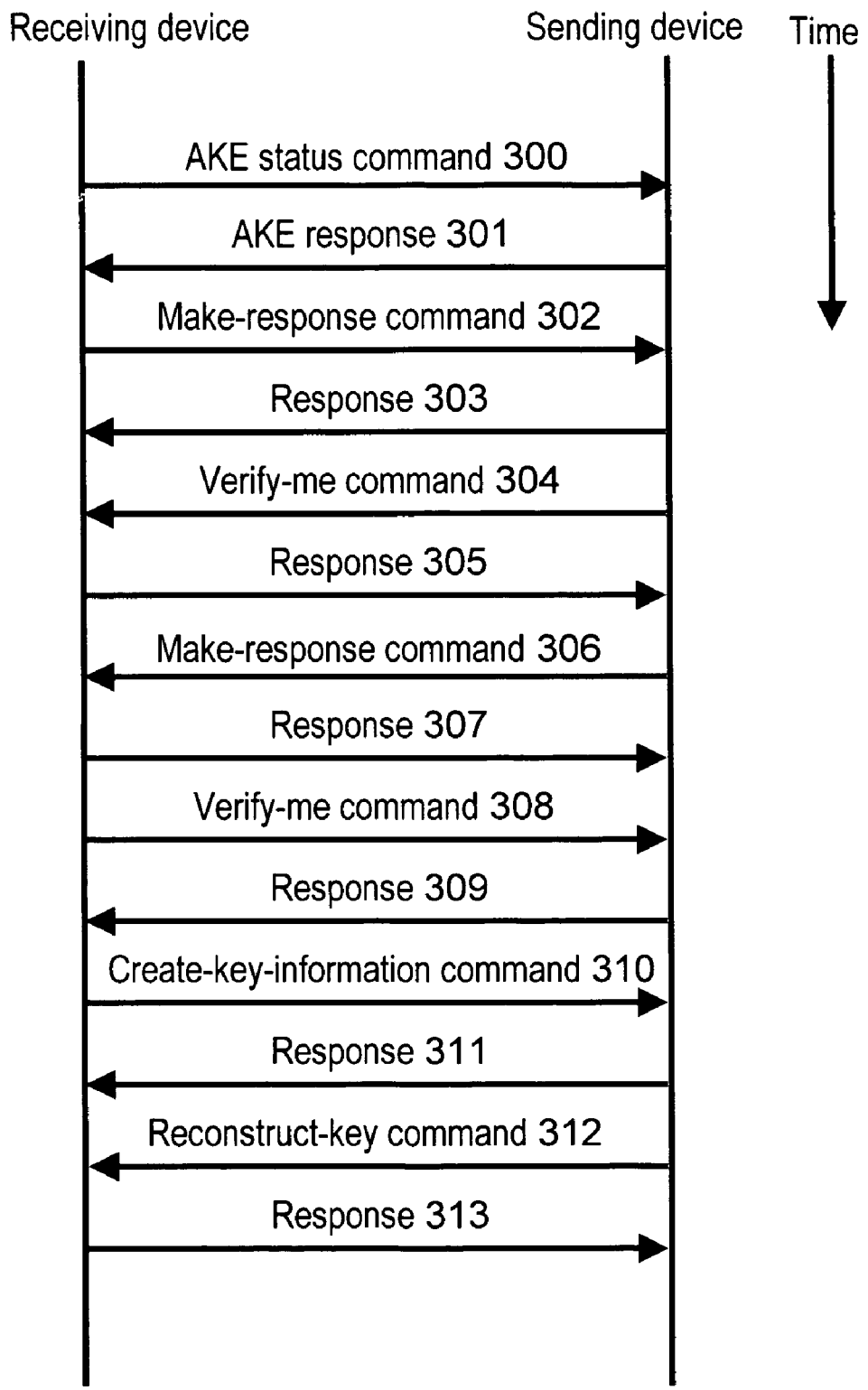
FIG. 4 is a schematic view illustrating procedures for transmitting an asynchronous packet between sending and receiving devices in accordance with the preferred embodiment of the present invention.
Figure 5:
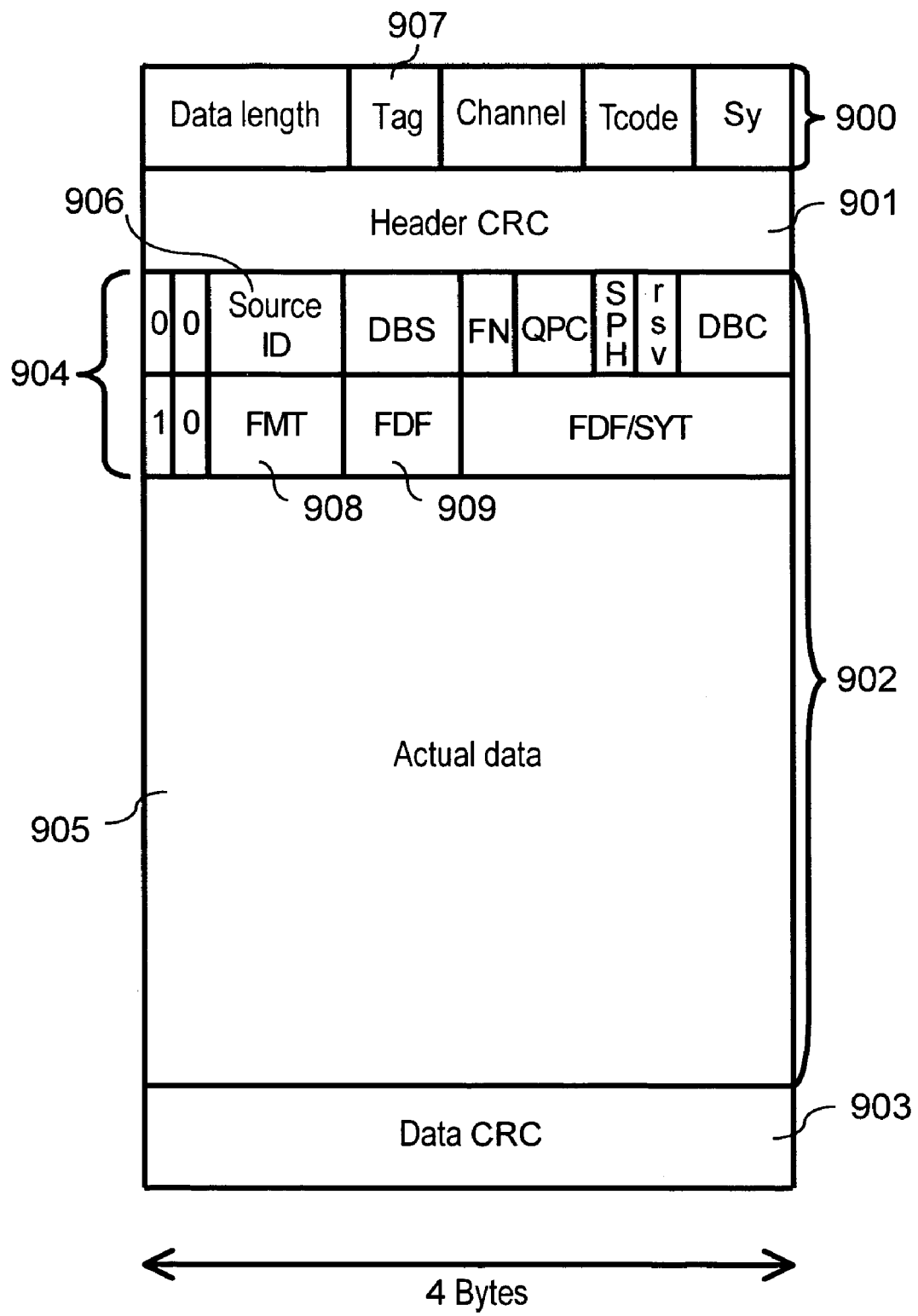
FIG. 5 is a format of isochronous packet in a data transfer method of the prior art.

FIG. 4 shows a chronological example of AV/C commands which are exchanged between the sending device 110 and receiving device 128 before sending the encryption keys 109 and 126 from the sending device 110 to receiving device 128. First, operations of both devices before exchanging AV/C commands shown in FIG. 4 are briefly described.

An initial condition is that non-encrypted TSP is sent from the sending device 110. The TSP output from the signal source 100 is input to the encrypter 101. Since the output command 105 is set to the normal output, the encrypter outputs TSP as it is without encryption to the source packet generator 102, and registers the value 0 as the encrypting information 910. The source packet generator 102 adds 4-byte source packet header to the TSP received, and outputs it to the CIP block generator 103. The CIP block generator 103 adds 8-byte CIP header 954, and outputs it as isochronous payload 952 to the isochronous packet generator 107. Here, the encrypting information 910 contained in the CIP header 954 is 0 which is input from the encrypter 101. The isochronous packet generator adds the isochronous packet header 900, header CRC 901, and data CRC 903 to the received isochronous payload 952 to create the isochronous packet. This isochronous packet is output to the 1394 bus 111 by the 1394 packet I/O means 108. Since the applicable isochronous packet conforms to the AV protocol, the tag 907 in the isochronous packet header 900 is set to 1.

When the TSP output from the signal source 100 is changed, which means that AV information changes from that unprotected AV information to copy-protected AV information, the key generator 106 detects this change, and changes the output command 105 from the normal output to empty output. At the same time, the encryption key 109 for encrypting TSP is given to the encrypter 101.

When the output command 105 is for empty output, the encrypter 101 outputs an empty signal to the source packet generator 102 every time it receives a TSP from the signal source 100, and registers the value 1 as the encrypting information. At receiving the empty signal from the encrypter 101, the source packet generator 102 transmits the received empty signal as it is to the CIP block generator 103 without adding the source packet header. When the CIP block generator 103 receives the empty signal, it outputs only the CIP header 954 to the isochronous packet generator 107. Here, the encrypting information 910 in the CIP header 954 uses the value 1 output from the encrypter 101. The isochronous packet generator 107 creates an isochronous packet as the isochronous payload 952 using the CIP header 954 received from the CIP block generator, and outputs it to the 1394 packet I/O means 108. Since this isochronous packet conforms to the AV protocol, the value of the tag 907 is set to 1. The 1394 packet I/O means 108 outputs received isochronous packet to the 1394 bus 111. This isochronous packet is continuously output, and the isochronous packet only containing the CIP header 954 in this isochronous payload 952 is continuously output to the 1394 bus 111. The receiving device 128 receiving this isochronous packet checks its tag 907 by the 1394 packet I/O means 127, detects that the isochronous packet conforms to the AV protocol, and then outputs this isochronous packet to the payload extractor 123. The payload extractor 123 extracts the isochronous payload 952 from received isochronous packet, and outputs it to the actual data extractor 122. The actual data extractor 122 outputs the encrypting information 910 and source ID 906 in the CIP header 954 to the key generator 125. After the key generator 125 detects that the value of the encrypting information 910 is 1, the receiving device 128 learns that device outputting the isochronous packet from the source ID 906 is the sending device 110. Then, the key generator 125 finally goes onto a process for requesting the encryption keys 109 and 126 using the A/C commands, as shown in FIG. 4.

In FIG. 4, the AKE status command 300 is first sent from the receiving device 128 to sending device 110. This enables the receiving device 128 to query information exchange procedure that can be used by the sending device 110. Replying to this query, the sending device 110 returns the AKE response 301 to the receiving device 128. Information exchange procedure which the sending device 110 can execute is assigned in bits in the algorithm field 201 of the AKE response 301. This allows the receiving device 128 to learn which information exchange procedures can be executed by the sending device. For example, if the sending device 110 can execute the second and sixth information exchange procedures, binary indication in the algorithm field 201 of the AKE response 301 will be 0000000000100010.

The receiving device 128 receiving the AKE response 301 selects one optimal procedure from information exchange procedures that both sending device 110 and receiving device can execute. Then, AV/C commands are exchanged according to the selected exchange procedure. Let's say the receiving device 128 can execute the second and eighth information exchange procedures. Then, the information exchange procedure which can be executed by both sending device 110 and receiving device 128 is only the second procedure. Accordingly, the rest of authentication and information exchange are executed using the second procedure. In the AKE control command in this procedure, the value of algorithm ID will be 0 and the value of the algorithm field 201 will be 0000000000000010 in hexadecimal indication. The information exchange procedure specifies not only the sequence of exchanging a range of AKE control commands but also a format and processing method of the data 207 sent by each AKE control command.

In accordance with the second information exchange procedure, the key generator 125 sends the make response command 302 to the sending device 110. In the data 207 of this make response command 302, two random numbers RRa and RRb generated by the key generator 125 are encrypted, and the algorithm field 201 contains identification information indicating the use of the second procedure. The key used for encryption is a common secret key given to both authorized sending device and receiving device in advance. The key generator 106 receiving the make-response command 302 checks the algorithm field 201 of the received make-response command 302, and learns to use the second procedure for the rest of authentication and information exchange. Since the key generator 106 can execute the second procedure, the key generator 106 knows that the data 207 of the make response command 302 sent in accordance with this second procedure contains two random numbers encrypted by this secret key. After taking out two random numbers RRa and RRb from the data 207 using this secret key, the key generator 106 returns a response 303 to inform that a response can be generated. Then, the key generator 106 stores one of the random numbers RRa taken out in the data 207, and sends the verify-me command 304 to the receiving device 128. This is the response requested by the previous make-response command 302. Hereafter, the algorithm field 201 of each AKE command exchanged between the sending device 110 and receiving device 128 always contain the identification information indicating the second procedure.

The key generator 125 receiving the verify-me command 304 confirms that RRa in the data 207 conforms to the random number RRa generated by itself, and then returns a response 305 to the verify-me command 304 to inform that verification has completed successfully. The key generator 125 then finally authenticates that the sending device 110 is an authorized sending device.

The sending device 110 then use the make-response command 306 and verify-me command 308 in accordance with the procedures after the make-response command 302 described above to confirm that the receiving device 128 is an authorized receiving device. However, the random number used here is RTa and RTb, and the random number sent back by the verify-me command 308 is RTb.

Now that both sending device 110 and receiving device 128 know the random numbers RRb and RTb, and have confirmed that both are authorized devices, the key generator 106 and key generator 125 separately generates a temporary key (not illustrated) from RRb and RTb using a common operation method specified by the second procedure. These temporary keys are a common key only between the sending device 110 and receiving device 128.

Next, the key generator 125 sends the create-key-information command 310 to the sending device 110. A channel number of the isochronous packet that the receiving device 128 is currently receiving is stored in the channel No. 204 of the create-key-information command 310. The key generator 106 receiving this create-key-information command 310 encrypts the encryption key 109 to be used for encrypting TSP with the aforementioned temporary key, and then returns a response 311 to inform that the create-key-information command 310 has completed successfully. Then, the key generator 106 sends the reconstruct-key command 312 which stores the encryption key 109 encrypted by the temporary key in its data 207 to the receiving device 128. The key generator 125 uses the temporary key to decrypt the data 207 of the reconstruct-key command 312 received, and obtains the encryption key 126. Then, the key generator 125 returns a response 313 to inform that the reconstruct-key command 312 has completed successfully. Since the encryption keys 109 and 126 are encrypted and decrypted using the same temporary key, they are the same keys. The encryption key 126 is output from the key generator 125 to the decrypter 121. This completes the procedure for granting decrypting information.

The key generator 106 which has sent the reconstruct key command 312 outputs the output command 105 for encrypted output to the encrypter 101. The encrypter 101 receiving this command encrypts TSP received from the signal source 100 by the encryption key 109, and starts to output it to the source packet generator 102. This enables the sending device 110 to send the isochronous packet containing TSP encrypted by the encryption key 109 in its isochronous payload 952 on the 1349 bus 111. This isochronous packet received by the receiving device 128 is decrypted by the decrypter using the encryption key 126 as described above, and outputs the decrypted packet to the AV generator 120.

In the above series of AKE control commands, each set of the make response command 302 and verify-me command 304; make-response command 306 and verify-me command 308; and create-key-information command 310 and reconstruct-key command 312, respectively has the same label 202. The make-response command 302, verify me command 308, create-key-information command 310, and reconstruct key command 312 also have values 1, 2, 3, 4, 5, and 6 in the step No. 203 respectively.

If the actual data 105 in the isochronous packet output from the sending device 110 changes from encrypted actual data 105 to non-encrypted actual data 105, the decrypter 121 detects the change in the encrypting information 910, stops decryption, and outputs the data received from the actual data extractor 122 as it is to the AV generator 120.

If a bus reset occurs in the 1394 bus 111 after the aforementioned processes shown in FIG. 4 starts, the procedures after and make-response command 302 need to be repeated.

As described above, in the preferred embodiment of the present invention, the sending device sends encrypting information which indicates the encryption status of the actual data in the isochronous packet together with the actual data. This enables the receiving device receiving the isochronous packet to make a request to the sending device for an encryption key for decrypting the actual data if the receiving device detects, by checking the encrypting information in the isochronous packet, that the data is encrypted. The sending device receiving the request then gives the encryption key to the receiving device. Accordingly, the data transfer method of the present invention offers extremely simple procedures for giving the encryption key from the sending device to receiving device for decryption.

Moreover, in the preferred embodiment of the present invention, the isochronous packet transferred via isochronous communication contains i) encrypting information indicating the encryption status of the actual data and ii) actual data, but only the actual data is encrypted for data transfer. This makes possible a data transfer method which has no risk of erroneous operation when a conventional receiving device receives encrypted actual data while maintaining compatibility with the conventional data transfer method.

Furthermore, in the preferred embodiment of the present invention, the CIP header remains non-encrypted for transfer even if encryption of synchronous data starts while the receiving device is continuously receiving synchronous data sent by the sending device. This enables a data transfer method which eliminates the possibility of erroneous operation of the receiving device receiving the data.

In the preferred embodiment, once encryption by the encryption key starts, actual data in all transfer units is encrypted and sent. However, it is not necessary to encrypt all units of data to be transferred. For example, even if both encrypted transfer units and non-encrypted transfer units are sent alternately, the receiving device can correctly decrypt the data because encrypting information is included in the CIP header, thus achieving the same effect. In addition, it is apparent that the same effect is also achievable even if the receiving device specifies a percentage of encrypted transfer units to the sending device. The size of the MPEG source packet is 192 bytes, with more than one source packet stored in one isochronous payload in the case of the high data rate transfer of MPEG (12 Mbps minimum). Naturally, however, it is not possible to have both encrypted source packet and non-encrypted source packet in the same isochronous payload.

In the preferred embodiment, all actual data is encrypted using the encryption key. However, it is not necessary to encrypt all pieces of data. For example, the same effect is achievable by encrypting the first half of the actual data, or encrypting the first and third quarters of the actual data. In this case, the receiving device can decrypt appropriately, if, when sending the data, information is inserted to indicate encrypted portions and their percentage in the CIP header. The same effect is also achievable by inserting in the CIP header encrypting information announcing whether the actual data is encrypted or not. The receiving device queries the sending device via asynchronous communication about which part of the actual data is encrypted and to what level, when the receiving device detects encryption by checking the CIP header. The same effect is also achievable in this case even when the receiving device specifies the encryption area and percentage to the sending device via asynchronous communication. If only the confidential portion in the actual data is encrypted, the burden for encryption and decryption is reduced, and at the same time, a sufficient effect of encryption may be achieved.

In the preferred embodiment, the isochronous packet containing only the CIP header without actual data is transferred until the completion of mutual authentication between the sending and receiving devices. However, the same effect is achievable even when an isochronous packet containing encrypted actual data is output from the start, and not the isochronous packet containing only the CIP header.

In the preferred embodiment, procedures for transferring the AKE control commands between sending and receiving devices are determined by mutual negotiation.

However, if the receiving device features only one executable procedure, the same effect is achievable by starting to transfer commands immediately, without executing this negotiation procedure, using only the executable procedure. In this case, it may be preferable to specify in advance a basic minimum of executable procedures for all authorized devices.

In this preferred embodiment, direct authentication is implemented between the sending and receiving devices, following which decrypting information is transferred using a secret key. However, the means for transferring authentication and decrypting information is not limited to this procedure. For example, a public key may be used for mutual indirect authentication and the creation of a temporary key. Decrypting information may then be transmitted using this temporary key. Such procedures are briefly described below.

The sending and receiving device stores the key information necessary for mutual indirect authentication in the data 207 of the AKE control commands, and send this information to each other in line with a procedure determined by mutual negotiation. Here, the subfunction 299 is set to the exchange. This enables both sending and receiving devices to share the same temporary key if they are both authorized devices. Decrypting information is then transferred using the create-key-information command and reconstruct-key command in accordance with the same procedures as those described in the preferred embodiment.

In the preferred embodiment, the procedure for transferring AKE control commands exchanged between sending and receiving devices is determined by mutual negotiation. If the types of procedures executable by the sending device are known in advance, the same effect is achievable by having the receiving device transfer commands using a procedure executable by the sending device without first executing this negotiation procedure.

In the preferred embodiment, procedures for transferring AKE control commands exchanged between sending and receiving devices are determined by mutual negotiation. However, the method for determining transfer procedures is not limited to this one. More specifically, if priority is given in advance to each of several transfer procedures, the receiving device may start to transfer using the procedure given the highest priority which is executable by itself. If the sending device cannot execute that procedure, the receiving device tries to transfer data by going down the list of procedures in order of priority until a procedure that is executable by both the sending and receiving device is found. The AKE control commands are then transferred using this procedure to achieve the same effect.

In the preferred embodiment, the sending device encrypts decrypting information which is used for decrypting actual data before transferring it to the receiving device. However, the way the receiving device obtains decrypting information is not limited to this procedure. In other words, the sending device may provide the receiving device sufficient information for obtaining decrypting information, without transferring encrypted decrypting information, and the receiving device may obtain decrypting information indirectly from this information. More specifically, the sending device transfers only the type of hash function to the receiving device, and the receiving device obtains decrypting information using the received type of hash function to achieve the same effect.

The preferred embodiment described above comprises an example of the AKE command format. However, the AKE command format is not limited to this one. In other words, the AKE command format indicated in this embodiment is just one example of how the preferred embodiment may be realized. The same effect is achievable by using commands in a different format.

INDUSTRIAL APPLICABILITY

As described above, the present invention has the significant effect of realizing a data transfer method using extremely simple procedures for passing key information from the sending device to the receiving device for decryption. Encryption identification information indicating the encryption status of actual data in synchronous data is sent together with actual data. The receiving device receiving the synchronous data checks the encryption identification information in the synchronous data, and if it detects that the actual data is encrypted, the receiving device requests the sending device for decrypting information for decrypting the encrypted data. The sending device receiving this request gives the decrypting information to the receiving device.

The present invention has another significant effect of realizing a data transfer method which eliminates the possibility of erroneous operation of the receiving device even if conventional receiving device receives encrypted synchronous data, while maintaining compatibility with a conventional data transfer method. Synchronous data transferred through synchronous communication contains i) encryption identification information indicating encryption status of the actual data and ii) actual data, but only the actual data is encrypted for data transfer.

The present invention has still another significant effect of realizing a data transfer method which eliminates the possibility of erroneous operation of the receiving device even if encryption of synchronous data starts while the receiving device continuously receives synchronous data sent from the sending device. Synchronous data transferred through synchronous communication contains i) encryption identification information indicating encryption status of the actual data and ii) actual data, but only the actual data is encrypted for data transfer. This enables to transfer the CIP header as it is without being encrypted.

The present invention has still another significant effect of realizing a data transfer method which always executes the most suitable procedure even when new and conventional devices share the same network. A procedure for both authentication and decrypting information with good future extendibility are achievable by selecting a procedure for providing authentication information and decrypting information exchanged between the sending and receiving devices by negotiation between the sending and receiving devices. In other words, even if a new authentication method or decrypting information become available in the future, the most suitable procedure will remain selectable by negotiation between devices even if a device which can use the new procedure and a device which can use only conventional procedures share the same network, as long as the new device is back-compatible with older procedures.

The present invention has still another significant effect of realizing decryption even if software which has a low encryption/decryption processing rate is used. The present invention allows the relative proportion of encrypted actual data and non-encrypted actual data to be varied within a single file. Accordingly, even if the receiving device has no exclusive hardware for high-speed data decryption, software can be used instead. More specifically, even if the receiving device has no hardware for decryption like PC, rapid processing is made possible by reducing the proportion of encrypted data in the file and thus shortening the time required for the decryption process.

The present invention has still another significant effect of realizing a data transfer method which uses the limited bus transfer band efficiently and significantly reduces the risk of unauthorized device receiving readable data. Unless the sending and receiving devices mutually authenticate that both are authorized devices, isochronous packets without actual data are output.

What is claimed is:

1. A method for transferring data on a bus system using both isochronous communication and asynchronous communication; said isochronous communication is for any device on the bus to receive synchronous data; said asynchronous communication is for a predetermined device to receive asynchronous data; said synchronous data capable of containing actual data and encryption identification information indicating encrypted actual data; and encrypted actual data is decrypted using decrypting information obtained through the following steps:

a) receiving said synchronous data at a receiving device, said encryption identification information received by said receiving device without encryption, and said receiving device via said asynchronous communication requesting decrypting information for said actual data from a sending device sending said synchronous data, if said encryption identification indicates encrypted actual data;

b) receiving said request at said sending device and said sending device sending one of:
      i) encrypted decrypting information of said actual data; and
      ii) decrypting information data for obtaining said decrypting information,
   to said receiving device via said asynchronous communication; and c) executing at said receiving device one of:
      i) extracting said decrypting information from said encrypted decrypting information; and
      ii) obtaining said decrypting information using said decrypting information data.

2. The method for transferring data as defined in claim 1, wherein a plurality of procedures are available between the steps of detecting encrypted actual data and obtaining said decrypting information by said receiving device receiving said synchronous data; and said receiving device executes the following steps for obtaining said decrypting information before requesting said decrypting information:

i) querying said sending device of types of procedures executable by said sending device before requesting said decrypting information;

ii) selecting a procedure from those executable by both said sending device and receiving device; and iii) obtaining said decrypting information in accordance with said selected procedure.

3. The method for transferring data as defined in claim 2, wherein a procedure is selected in accordance with a predetermined priority when there are a plurality of procedures executable by both of said sending device and said receiving device.

4. The method for transferring data as defined in claim 1, wherein a plurality of procedures are available between the steps of detecting encrypted actual data and obtaining said decrypting information by said receiving device receiving said synchronous data; and said receiving device executes the following steps for obtaining said decrypting information:

i) starting a procedure selected from said plurality of procedures in accordance with a predetermined priority;

ii) re-selecting said procedures one-by-one until a procedure executable by said sending device is found; and iii) obtaining said decrypting information in accordance with the selected procedure executable by said sending device.

5. The method for transferring data as defined in claim 2, wherein said asynchronous data transmitted between said sending device and said receiving device in accordance with said selected procedure contains an identifier for indicating the type of said procedure executed.

6. The method for transferring data as defined in one of claims 1 to 5, wherein said receiving device authenticates whether said sending device is an authorized sending device before making a request for said decrypting information.

7. The method for transferring data as defined in one of claims 1 to 5, wherein said sending device receiving a request for said decrypting information authenticates that said receiving device is an authorized receiving device before sending encrypted decrypting information of said actual data.

8. The method for transferring data as defined in one of claims 1 to 5, wherein said sending device and said receiving device are authenticated as authorized devices before said receiving device makes a request for said decrypting information.

9. The method for transferring data as defined in one of claims 1 to 5, wherein the following steps are executed before said receiving device makes a request for said decrypting information:

i) said receiving device sending information required by said sending device at least for establishing a common key with said sending device; and ii) said sending device sending information required by said receiving device at least for establishing said common key with said receiving device;

and said sending device encrypting said decrypting information using said common key and sending said encrypted decrypting information; and said receiving device extracting said decrypting information from said encrypted decrypting information received using said encryption key.

10. The method for transferring data as defined in one of claims 1 to 5, wherein only said actual data is encrypted.

11. The method for transferring data as defined in claim 10, wherein the following steps are executed before said receiving device makes a request for said decrypting information:

i) said receiving device sending information required by said sending device at least for establishing a common key with said sending device; and ii) said sending device sending information required by said receiving device at least for establishing said common key with said receiving device;

and said sending device encrypting said decrypting information using said common key and sending said encrypted decrypting information; and said receiving device extracting said decrypting information from said encrypted decrypting information received using said common encryption key.

12. The method for transferring data as defined in claim 3, wherein said asynchronous data transmitted between said sending device and said receiving device in accordance with said selected procedure contains an identifier for indicating the type of said procedure executed.

13. The method for transferring data as defined in claim 4, wherein said asynchronous data transmitted between said sending device and said receiving device in accordance with said selected procedure contains an identifier for indicating the type of said procedure executed.

14. The method for transferring data as defined in one of claims 1 to 5, 12 or 13, wherein said sending device includes a signal source for said actual data and determines encryption of said actual data in a fixed length unit which is output from said signal source; and said sending device places encrypted actual data and non-encrypted actual data in different output units of said synchronous communication, and then outputs them to said bus system.

15. The method for transferring data as defined in claim 14, wherein the following steps are executed before said receiving device makes a request for said decrypting information:

i) said receiving device sending information required by said sending device at least for establishing a common key with said sending device; and ii) said sending device sending information required by said receiving device at least for establishing said common key with said receiving device;

and said sending device encrypting said decrypting information using said common key and sending said encrypted decrypting information; and said receiving device extracting said decrypting information from said encrypted decrypting information received using said common encryption key.

16. The method for transferring data as defined in claims 1 to 5, 12 or 13, wherein said receiving device authenticates whether said sending device is an authorized sending device before making a request for said decrypting information.

17. The method for transferring data as defined in one of claims 12 or 13, wherein said receiving device authenticates whether said sending device is an authorized sending device before making a request for said decrypting information.

18. The method for transferring data as defined in one of claims 12 or 13, wherein said sending device receiving a request for said decrypting information authenticates that said receiving device is an authorized receiving device before sending encrypted decrypting information of said actual data.

19. The method for transferring data as defined in one of claims 12 or 13, wherein said sending device and said receiving device are authenticated as authorized devices before said receiving device makes a request for said decrypting information.

20. The method for transferring data as defined in one of claims 12 or 13, wherein the following steps are executed before said receiving device makes a request for said decrypting information:

i) said receiving device sending information required by said sending device at least for establishing a common key with said sending device; and ii) said sending device sending information required by said receiving device at least for establishing said common key with said receiving device;

and said sending device encrypting said decrypting information using said common key and sending said encrypted decrypting information; and said receiving device extracting said decrypting information from said encrypted decrypting information received using said encryption key.

* * * * *